United States Patent [19]

Grundahl et al.

[11] Patent Number: 4,648,582
[45] Date of Patent: Mar. 10, 1987

[54] PORTABLE CLAMPING DEVICE FOR A WHEEL JACK

[76] Inventors: John C. Grundahl; Bryce K. Grundahl, both of Route 1, Box 149A, Dassel, Minn. 55325

[21] Appl. No.: 742,110

[22] Filed: Jun. 6, 1985

[51] Int. Cl.⁴ .............................................. B66F 3/00
[52] U.S. Cl. ................................ 254/133 R; 269/130
[58] Field of Search .......... 254/133, 134, 1, 50.1–50.4; 269/37, 130, 131; 29/273

[56] References Cited

U.S. PATENT DOCUMENTS

| | | | |
|---|---|---|---|
| 1,666,173 | 4/1928 | Heide | 269/130 |
| 1,706,495 | 3/1929 | Moore | 254/133 R |
| 1,750,663 | 3/1930 | Dart | 254/133 R |
| 2,652,625 | 9/1953 | Perkins | 254/133 R |
| 2,742,635 | 4/1956 | Capps | 269/131 |
| 4,571,142 | 2/1986 | Niewald et al. | 254/2 R |

Primary Examiner—Roscoe V. Parker
Assistant Examiner—Judy J. Hartman
Attorney, Agent, or Firm—Barnes & Thornburg

[57] ABSTRACT

A portable clamping device is provided which is quickly and easily attachable to the axle of a vehicle. The clamping devices provides a base upon which a lifting device can be positioned for lifting a wheel to be installed or removed from a vehicle relative to the vehicle axle. The device comprises a longitudinally extending base that can be installed on an axle through the central hole in a wheel to be affixed to the axle. The base includes several sets of guides for guiding a cable slidably attached to the base during the clamping operation. One set of guides extends transversely from the base while a second set of guides defines a longitudinal path along the base. The cable is positioned by the guides such that an arcuate segment of the cable in contact with the first set of guides extends in a plane transverse to the base. A linear segment of the cable in contact with the second set of guides extends along a longitudinal path on the base. A cable retracting device is provided on the base for reversibly retracting the cable segment extending along the base. In response to retraction of the linear segment, the arcuate segment progressively engages the axle of the vehicle, thereby clamping the vehicle axle. The lifting device positioned on the secured clamping device can than be employed to lift a wheel to be installed on the vehicle relative to the vehicle axis and to align wheel fastening elements on the vehicle hub with the wheel.

22 Claims, 3 Drawing Figures

PORTABLE CLAMPING DEVICE FOR A WHEEL JACK

BACKGROUND AND SUMMARY OF THE INVENTION

The present invention relates generally to a portable clamping device for supporting a wheel jack during installation or removal of a wheel from a vehicle. More particularly, the invention relates to a clamping device capable of accomplishing this support function while being clamped to an axle of the vehicle.

The device of the present invention has a particularly advantageous application when used on heavy farm and industrial vehicles. Often, such vehicles require addition of extra wheels due to weather and ground conditions. For example, an extra set of dual wheels are often temporarily installed on farm tractors to provide more traction and reduce soil compaction by increasing the ground contact area over which the weight of the vehicle is distributed. These dual wheels are mounted outboard of the standard drive wheels and may be frequently installed and removed as required by weather and field conditions. Each wheel can weigh from 400 to 1800 pounds (depending on size and whether filled with fluid) thereby making handling and lifting a difficult and time consuming chore. Once the wheels have been lifted to the appropriate height adjacent the vehicle axle, the wheel must be rotated for purposes of aligning lug holes in the wheel with lugs on the vehicle. Finally, the wheel must be horizontally displaced to engage the lugs nd the lug holes.

Prior art apparatuses for accomplishing the wheel lifting, rotating and horizontal displacing steps have primarily comprised overhead hoist and sling or hook arrangements. These devices are used to lift the dual wheel into position for mounting. Typically, the vehicle must be lifted with a floor jack and the wheel manually turned while suspended by the overhead hoist and sling arrangement. This operation requires several pieces of large equipment, i.e. hoist and jack, and may consume 30 minutes or more of the installer's time. Additionally, the vehicle will have to be transported to the location of the required equipment, or the required equipment will have to be transported to the location of the vehicle, thereby further increasing the amount of time required for the operation.

Accordingly, one object of the present invention is the provision of a device which facilitates the wheel lifting, rotating and displacing steps in a wheel installing or removing operation.

Another object of the present invention is the provision of a wheel installing or removing device which is quickly and easily installed on a vehicle.

A further object of the present invention is the provision of a device which is relatively light weight and portable.

Still another object of the present invention is the provision of a device for changing wheels which operates with equal efficiency when a vehicle is located in a soft field or on a solid floor.

These and other objects of the present invention are attained by the provision of a portable clamping device which is quickly and easily attachable to the axle of a vehicle. The device comprises a longitudinally extending base of such dimensions that it is installed on an axle through the central hole in a wheel to be installed. The base includes several sets of guides for guiding a cable slidably attached to the base during the clamping operation. A first set of guides extends transversely from the base while a second set of guides define a longitudinal path along the base. A cable is positioned by the guides such that an arcuate segment of cable in contact with the first set of guides extends in a plane transverse to the base. A linear segment of the cable in contact with the second set of guides extends along a longitudinal path on the base. A cable retracting device on the base reversibly retracts the cable segment in contact with the second set of guides.

In operation, a wheel to be installed on a vehicle is positioned adjacent the vehicle such that the central wheel hole is adjacent the vehicle axle. The clamping device is then inserted through the hole in the wheel and the arcuate cable section is positioned around the axle. The cable segment extending along the longitudinal path on the base is then retracted by the cable retracting device of the base. This retracting force applied to the cable causes the arcuate segment of the cable to progressively engage the vehicle axle, thereby resulting in radial clamping of the arcuate segment about the axle. The cable is retracted until the desired degree of radial clamping is achieved and until the longitudinal base is substantially parallel to the vehicle axle. A lifting device such as a jack is then supported on the base and a single ball transfer assembly positioned on top of the jck ram is engaged with the underside of the annular wheel rim portion. The ball transfer assembly permits rotation of the wheel for purposes of aligning the lug holes of the wheel with the lugs of the hub assembly. Finally, the single ball transfer on the jack ram enables the installer to horizontally slide the wheel for the purpose of engaging the wheel holes with the lug bolts of the hub assembly. The lug bolts are then torqued to the proper specification and the jack and clamping device are removed from the axle. The subject device can be installed on a vehicle such as a tractor in less than a minute and requires only one wrench for installation.

Other objects and advantages of the present invention will be more apparent from the following detailed description of preferred embodiments, when taken in conjunction with the drawings.

DETAILED DESCRIPTION OF THE DRAWINGS

Figure 1:
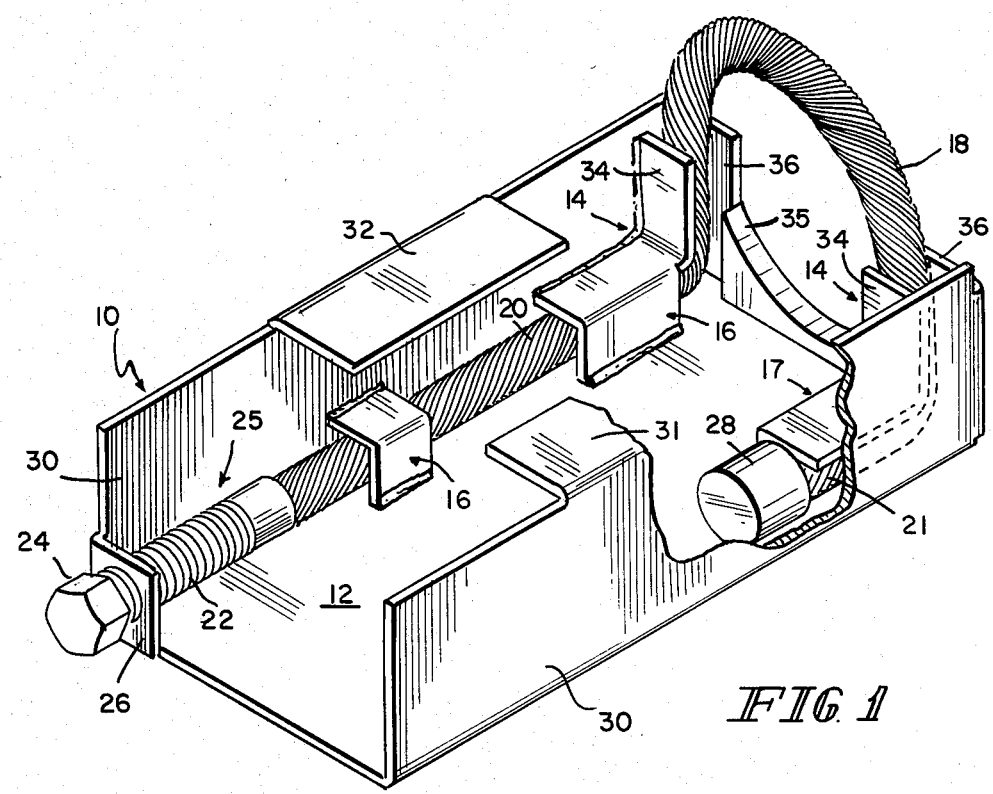
FIG. 1 shows a side perspective view of clamping means constructed according to a preferred embodiment of the present invention.

Referring now to FIG. 1, a supporting device 10 constructed in accordance with the present invention is shown having a longitudinally extending base 12 with transversely extending guides 14 comprising spaced parallel plates 34 and 36. Another set of guides 16 extend longitudinally along base 12 and define a longitudinal path thereon.

A cable having segments 18 and 20 is supported by base 12 exhibiting guides 14 and 16. Arcuate segment 18 is supported transversely to base 12 by transverse plates 34 and 36 of the transverse guides 14. Segment 20 of the cable is confined to a longitudinal path by guides 16 of base 12.

Attached to the end of segment 20 of the cable is retracting device 25. In a preferred embodiment, the retracting device comprises a threaded rod 22 attached to cable segment 20 and passing through an opening in plate 26 extending transversally from plate 12. Engaged with the end of threaded rod 22 is threaded nut 24. Also extending longitudinally along a portion of base 12 is cable segment 21 guided by guide 17. Attached to the end of cable segment 21 is stop device 28.

Figure 2:
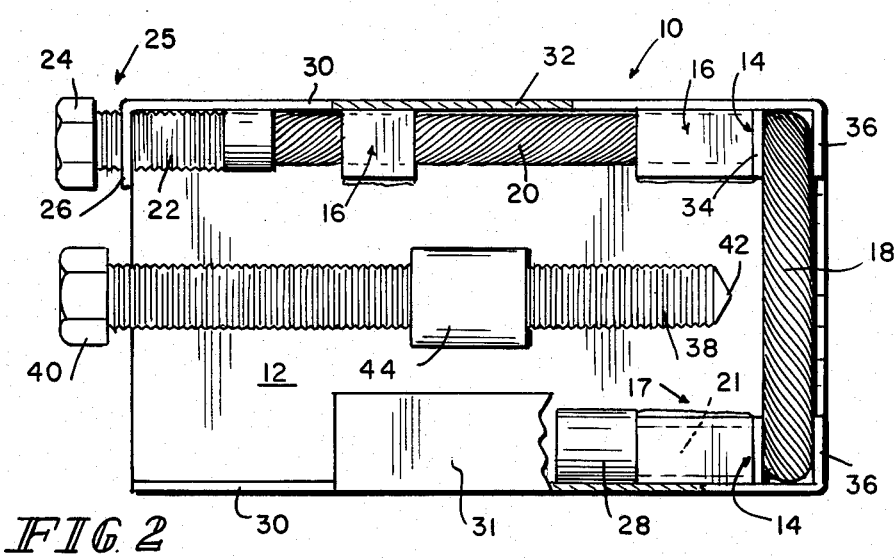
FIG. 2 shows a top view of the clamping device of FIG. 1.
Figure 3:
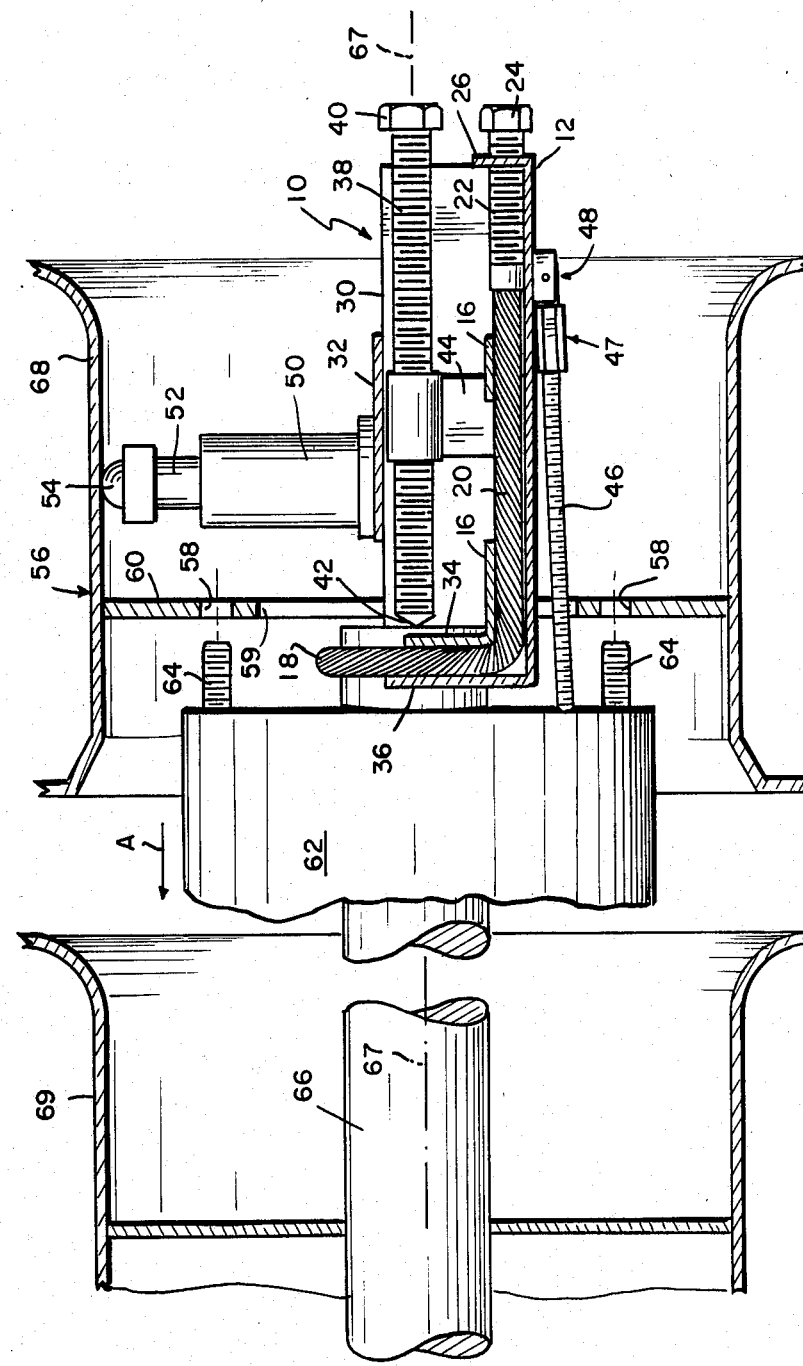
FIG. 3 schematically shows the clamping device of FIGS. 1 and 2 engaged with a vehicle axle and supporting a wheel jack.

In FIG. 3, there is shown a wheel 68 exhibiting a disk shaped portion 60 adjoined to annular portion 56. The vehicle to be serviced is driven onto a thick board or plank to compensate for the squat of the tire and generate a small amount of ground clearance for installation of a dual wheel 68 adjacent the drive wheel 69. Usually, dual wheel hub 62 is installed on axle 66 outside of drive wheel 69 such that the axle protrudes at least about one half inch beyond the surface of the hub 62. Disk shaped portion 60 of the wheel is positioned adjacent the axle hub 62 connected to axle 66 of the vehicle. Hub 62 exhibits a series of peripheral threaded lugs 64 for attachment of wheel portion 60 exhibiting lug holes 58. Wheel portion 60 additionally exhibits central opening 59. After the wheel portion 60 has been positioned adjacent vehicle axle 66 and hub 62, the supporting device 10 of the present invention is inserted through hole 59 and engaged with the vehicle axle 66. The device is positioned such that vehicle axle 66 extends through an opening in the device formed by arcuate cable segment 18 and arcuate support plate 35 extending from base 12. After the device has engaged axle 66, retracting nut 24 is turned clockwise, thereby causing threaded rod 22 to be retracted through the opening in plate 26 attached to base 12. Retraction of threaded rod 22 attached to cable segment 20 in turn causes cable segment 20 to be retracted along the longitudinal path formed by guide means 16. Retraction of cable segment 20, connected with arcuate cable segment 18, in turn causes cable segment 18 to be drawn into guide means 16 on base 12. Cable segment 21 (FIGS. 1 and 2) remains within guide means 17 of base 12 due to the presence of stop means 28 fixed to the end of cable section 21. Stop means 28 exhibits a diameter of a size which precludes movement of stop means 28 into and through guide means 17. Accordingly, cable segment 21 has a position which is effectively fixed with respect to guide means 17 and base 12. Due to this stop arrangement, progressive rotation of nut 24 in a clockwise direction will cause arcuate cable segment 18 to progressively engage axle 66 with increasing radial clamping force.

When sufficient clamping force has been applied to axle 66 by retraction of cable segment 20 along base 12, lifting means 50 is positioned on lifting support structures 31 and 32 extending from transverse walls 30 of base 12. Lifting means 50 is, for example, any of the prior art lifting devices such as a hydraulic or scissor jack. In the embodiment of FIG. 3, a hydraulic jack is placed upon support structures 31 and 32. The hydraulic jack 50 has a single ball transfer 54 on jack ram 52. As jack ram 52 is raised, ball 54 engages annular rim portion 56 of wheel 68. A vertical lifting force is applied to annular rim portion 56 of wheel 68 until the center of disk shaped rim portion 60 is aligned with the axis of rotation 67 of vehicle axle 66. At this point, wheel 68 has been lifted to the desired vertical position for engagement with hub 62.

After wheel 68 has been jacked to the appropriate vertical position, the series of lug holes 58 in disk shaped portion 60 of the wheel must be aligned with the corresponding series of lug bolts 64 on vehicle hub 62. A single ball transfer means 54 on jack ram 52 permits rotation of wheel 68 about axis 67 until proper alignment of lug bolt 64 and lug holes 58 is attained.

After the proper rotational alignment has been attained, single ball transfer 54 of ram 52 permits horizontal displacement of hub portion 60 into engagement with hub 62 (in the direction indicated by arrow A in FIG. 3) while maintaining the appropriate vertical and rotational alignment of wheel 68.

After the wheel is engaged with hub 62, lug nuts are installed on the lug bolts 64. Jack ram 52 is then lowered causing ball transfer means 54 to disengage from annular rim portion 56. Jack 60 is removed from support structures 31 and 32 of the support device. Nut 24 of the device is then turned in a counter clockwise direction, thereby progressively decreasing the clamping force applied to axle 66 by arcuate cable segment 18 until arcuate segment 18 no longer exerts a clamping force on axle 66. At this point, the device 10 may be removed from the vehicle.

The device of the preferred embodiment 10 is readily and economically manufactured from standard fabrication materials and with standard fabrication techniques. The device, as can be seen from the above description, is readily adaptable to all types of bar axles and vehicle hubs due to the use of flexible cable which adapts to a variety of axle contours.

It is also readily apparent from the preceding description that the device can be used notwithstanding the condition of the vehicle supporting surface. Unlike conventional prior art hoists and ground supported jacks which are dependent on the condition of the vehicle supporting surface, the subject device is supported only by wheel receiving means on the vehicle itself.

As shown in FIGS. 2 and 3, stabilizing means are advantageously employed in connection with the support device 10 of the present invention. The stabilizing means comprises a threaded rod 38 engaging threaded sleeve and support 44 on base 12. When the device of the present invention is in an in-use position, the axis of rotation of stabilizer rod 38 coincides with the axis of rotation of axle 67. Head portion 40 of threaded rod 38 is rotated in a clockwise direction until tip 42 of rod 38 engages the center of axle 66. Engagement of rod tip 42 with axle 66 results in increased support strength for subsequent jacking operations.

Additionally, support brace 46 is provided for particularly heavy duty applications such as lifting a ballast or fluid filled wheel. Support brace 46 comprises a threaded rod 46 engaging threaded sleeve 47 which is rotatably mounted to the underside of base 12 at pivot means 48. The support brace has a point at one end for engaging the lower portion of hub 62, thereby providing additional support for the support device.

Although the device of the present invention has a particularly advantageous application in the installation of wheels on vehicles, it can be readily appreciated that the clamping arrangement employing longitudinal and transverse guide means can be readily adapted to a variety of environments wherein radial clamping of an object is required. By appropriately positioning the article to be clamped between arcuate cable segment 18 and arcuate support portion 34 of base 12, and retracting cable portion 20 longitudinally along base 12, a linear retracting force in a first plane can be readily converted to a radial clamping force in a second plane transverse to the first plane. Such a clamping arrangement can be particularly useful where spatial contraints effectively preclude a retracting operation within the plane of radial clamping, i.e. the plane of arcuate cable segment 18, or immediately adjacent the plane of the radial clamping motion.

Although the invention has been described and illustrated in detail, it is to be clearly understood that the above is to be taken by way of illustration and example only and not by way of limitation. The spirit and scope of the invention are to be limited only by the terms of the appended claims.

What is claimed is:

1. A clamping device for supporting a lifting device for lifting a vehicle wheel, said device being reversibly engageable with a vehicle axle, comprising:
   longitudinally extending base means,
   first guide means extending transversely from said base means for defining a transverse plane,
   second guide means on said base means for defining a longitudinal path, said path extending in a direction away from said transverse plane,
   cable means for engaging said first and second guide means, said cable means having an arcuate segment with first and second end regions extending along said transverse plane, and at least one linear segment extending from said first end region of said arcuate segment along said longitudinal path,
   cable end securing means for securing said second end region of said arcuate segment to said base means, and
   cable retracting means on said base means for reversibly retracting said at least one linear segment of said cable away from said first guide means, said retracting means being capable of causing said arcuate segment to engage a surface of said axle positioned between said base and said arcuate segment in response to said retracting, and
   lifting device supporting means on said base means for supporting said lifting device.

2. A device according to claim 1, wherein said adjustable clamping means comprises cable means.

3. A device according to claim 2, wherein said cable means includes a longitudinally extending segment extending along said base means, said longitudinally extending segment being reversibly retractable.

4. A device according to claim 1, including longitudinally extending stabilizing means attached to said base means for stabilizing said base means relative to said axle.

5. A device according to claim 1, wherein said lifting device supporting means comprises wall means extending transversely from said base means, said wall means including plate means substantially parallel to said base means.

6. An apparatus according to claim 1, further comprising support brace means engagable with wheel receiving means adjacent said vehicle axle for supporting said base means relative to said wheel receiving means.

7. An apparatus according to claim 1, further comprising jack means reversibly engagable with said lifting device supporting means for lifting said wheel relative to said vehicle axle.

8. A device according to claim 7, wherein said jack means comprises hydraulic jack means.

9. An apparatus according to claim 7, wherein said jack means comprises mechanical jack means.

10. An apparatus according to claim 1, wherein said cable retracting means comprises threaded bolt means attached to said at least one end of said cable, and threaded bolt receiving means for receiving said bolt means while abutting said base means.

11. A device according to claim 1, wherein said base means comprises transverse plate means having an arcuate edge for engaging wheel receiving means on said vehicle.

12. An apparatus according to claim 1, wherein said second guide means comprises block means having longitudinally extending bores.

13. A device according to claim 4, wherein said longitudinally extending stabilizing means comprises longitudinally extending threaded rod means engageable with threaded sleeve means attached to said base means.

14. An apparatus according to claim 1, wherein said cable means has first and second substantially linear segments extending along said longitudinal path, said first segment being retractable by said retracting means, said second segment being fixed relative to said base means when said firse segment is retracted.

15. An apparatus according to claim 11, wherein said first guide means comprises first and second plate means, said first and second plate means being substantially parallel, said arcuate segment of said cable extending between said first nad second plate means.

16. A clamping device according to claim 1, wherein said cable end securing means comprises stop means fixed to said second end region, said stop means being engageable with said first guide means for securing said second end region of said arcuate segment ot said base means.

17. A clamping device according to claim 1, including engaging means for engaging a dual wheel to be installed on a heavy farm vehicle.

18. A clamping device comprising:
    longitudinally extending base means,
    first guide means extending in a transverse plane from a portion of said base means,
    second guide means on said base means for defining a longitudinal path along said base means, said path extending transversely from said first guide means,
    cable means guided along said first and second guide means, said cable means having an arcuate segment with first and second end regions extending along said transverse plane and at least one linear segment extending from said first end region of said arcuate segment along said longitudinal path,
    cable end securing means for securing said second end region of said arcuate segment to said base means, and
    cable retracting means on said base means for reversibly retracting said at least one linear segment of said cable away from said forst guide means, said retracting means being capable of causing said arcuate segment to engage a surface of an object positioned between said base and said arcuate segment in response to retraction of said at least one linear segment of said cable.

19. A device according to claim 18, further comprising longitudinally extending stabilizing means for stabilizing said base means relative to said object, said stabilizing means being capable of reversibly engaging another surface of said object to be positioned between said base means and said arcuate segment.

20. A clamping device according to claim 18, wherein said cable end securing means comprises stop means fixed to said second end region, said stop means being engageable with said first guide means for securing said second end region of said arcuate segment to said base means.

21. A device for supporting lifting means for lifting a wheel onto a vehicle axle comprising:
axle clamping means for reversibly clampingly engaging said axle,
said axle clamping means comprising flexible clamping means grippingly engageable with said axle in a clamping plane extending radially of said axle,
retracting means connected to the clamping means for actuating and deactuating the flexible clamping means, said retraction means extending along a plane transverse to the clamping plane and being movable in a direction transverse to said clamping plane during actuating and deactuating of the flexible clamping means, and
lifting device supporting means attached to said axle clamping means for supporting a lifting means during a wheel installing or removing operation, said supporting means comprising longitudinally extending base means extending transverse to the clamping plane of the flexible clamping means along the plane of the retracting means.

22. A device according to claim 21 wherein said flexible clamping means comprises a cable means.

* * * * *